Patented May 19, 1931

1,805,702

UNITED STATES PATENT OFFICE

HENRY J. MASTENBROOK, OF CLEVELAND HEIGHTS, OHIO, ASSIGNOR TO THE SWARTWOUT COMPANY, OF CLEVELAND, OHIO, A CORPORATION OF OHIO

REDUCING VALVE

Application filed October 15, 1928. Serial No. 312,550.

This invention relates to reducing valves and more particularly to a device for maintaining with great accuracy and within very narrow limits the fluid pressure at a given point in a fluid stream.

It is among the objects of my invention to provide a reducing valve which will maintain within very accurate limits the pressure of the fluid flowing from the valve. Another object is to provide a reducing valve wherein the pressure of the fluid flowing from the valve is integrated and multiplied in its effect upon the reducing valve. Another object is to provide a control for a reducing valve wherein very small changes in pressure in outflowing fluid will have the effect of causing substantially great changes in the pressure exerted upon the reducing valve actuating parts. Another object is to arrange such a valve along with its controlling parts as a complete and integral unit, the installation of which may be a simple matter. Another object is to provide a complete reducing valve object is to provide a complete reducing valve means for adjusting it to an extreme sensitiveness. A still further object is to provide a complete integral reducing valve and control therefor which may be adjusted after its installation to develop reduced pressures within a wide range of selection.

Other objects will appear from the following description of a preferred form of my invention, reference being had to the accompanying drawings. The essential characteristics are summarized in the claim.

Figure 1:
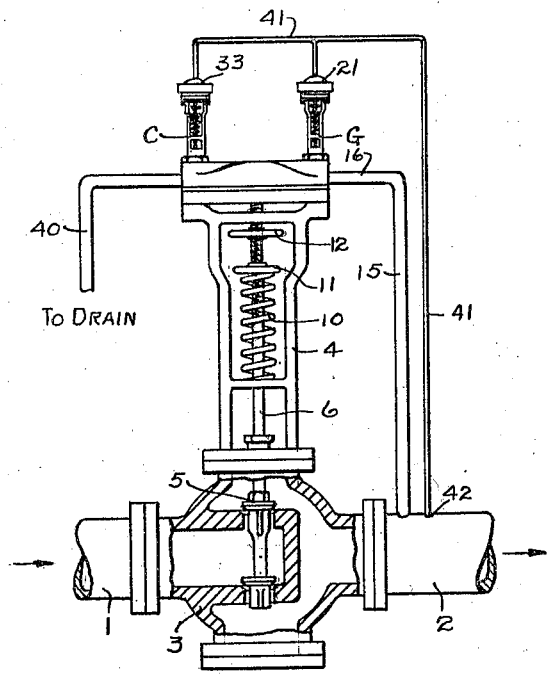
Figure 2:
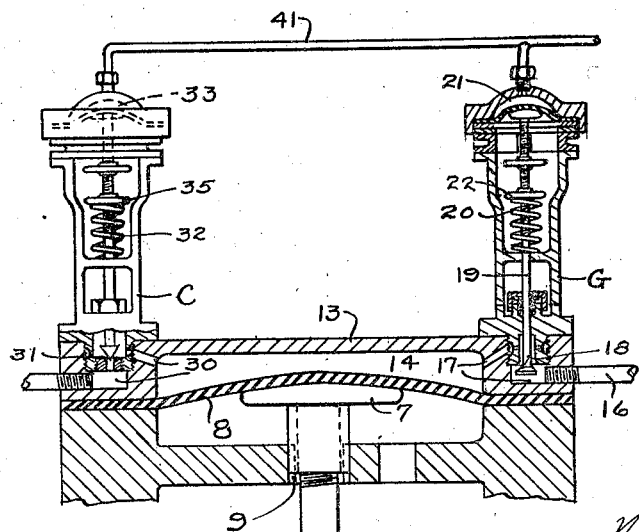

In the drawings, Fig. 1 is a layout of my valve and connections disposed in a fluid line or pipe; and Fig. 2 is an enlarged cross-section taken through the head of the valve and auxiliary valves.

Referring particularly to Fig. 1, I have illustrated a fluid line comprising a part 1 leading to the reducing valve 4 and a part 2 leading from the valve. For the sake of illustration, we may consider that water is brought through the pipe at high pressure and is intended to be discharged through the valve 4 at a constant low pressure. Within the body 3 of the valve 4 is preferably a balanced closure member 5 arranged with relation to the valve seats so that downward motion of the closure member restricts the flow through the valve. Extending upwardly from the closure member 5 is a valve stem 6 which at its upper end, see Fig. 2, carries a mushroom like member 7 which is engaged by a diaphragm 8. Associated with the mushroom like member and with the valve stem and with the supporting structure of the valve is a splined guide 9 holding the valve stem against rotation during its longitudinal travel. Associated with the valve stem and acting between the stem and the frame of the valve is a spring 10 which tends to open the valve. The strain in the spring may be adjusted through a nut 11 threaded on the valve stem. A second nut 12 is threaded on the valve stem and may be adjustably positioned to engage the frame of the valve, see Fig. 2, to limit the longitudinal travel of the valve stem.

Carried by suitable structure and arranged in the head 13 of the valve is a diaphragm chamber 14. Connecting the diaphragm chamber with the low pressure side of the valve, is a conduit 15. In the usual practice and construction of a reducing valve, the reduced or low pressure in the line 2 is established in the diaphragm chamber so that as this pressure increases the flow through the valve is throttled. As the pressure decreases the flow through the valve is increased by increasing the valve opening. It is and has been appreciated that with such a direct connection, the reduced pressure varies considerably because substantial changes in pressure are needed to move the valve closure member. My invention, as I am about to describe it, includes means incorporated in the structure of the valve which will take account of very small changes in the reduced pressure to effect major changes in the pressure established in the diaphragm chamber so that the reduced pressure may be maintained at a substantially constant amount within very accurate limits.

Referring particularly to Fig. 2, I show the conduit 15 terminating in the head of the valve as at 16 and connecting with a passageway 17 into the diaphragm chamber. The flow through the passageway 17 is controlled by a small valve G having a closure member 18 carried by a stem 19. A spring 20 associated with the stem tends to raise the stem and close the valve. The valve stem may be urged downwardly, moving the valve to open position, by a diaphgram enclosing a chamber 21. An adjusting nut 22 is arranged to vary the compression in the spring 20 so that various desired pressures need be established in the chamber 21 to actuate the valve G.

Leading from the diaphragm chamber 14 is a passageway 30 controlled by a small valve C having a closure member 31 which closes the passageway 30 when it is moved downwardly. Movement of the valve member 31 may be controlled through a stem 30 acted upon at its upper end by a diaphragm enclosing a chamber 33 and urged upwardly by a spring 32 in which the strain may be adjusted by a nut 35. Both of the valves C and G in the head of the main valve 4 may be of similar construction but of diametrically opposite effects in that downward movement of both valve closure members opens the passageway 17 and closes the passageway 30. A suitable discharge pipe 40 carries away fluid from the diaphragm chamber 14 to atmosphere or a point of low pressure.

The diaphragm chambers 21 and 33 are connected together through a conduit 41 which extends to and is joined to the low pressure side of the valve 4, as at 42. Thus the ultimate low pressure is always maintained in the diaphragm chambers 21 and 33 which exert equal forces to open the valve G and close the valve C. Thus the flow through the chamber 14 or the relative degree of inlet to outlet opening builds or reduces the pressure therein. As illustrated the valves C and G are relatively small compared to the main valve 4. For example, the valves C and G may be of ¼ inch capacity or less and the valve 4 may be of 4 inch capacity or greater. The small valves C and G are thus far more highly sensitive to small changes in pressure and respond to changes measured in ounces which by control of the passageways 17 and 31 cause great changes in pressure in the chamber 14. Thus in a given instance a small simultaneous movement of the valves C and G may double the opening through the valve G and halve the opening through the valve C so that the pressure in the chamber 14 is tended to be increased four-fold.

It will be appreciated that, except when one or the other of the valves C or G is closed, there will be a small flow of fluid through the conduit 15 and while I have illustrated a preferred arrangement, it should be mentioned in passing, that the conduit 15 need not necessarily be connected to the low pressure line 2 but may lead to any source of fluid pressure suitable for actuating the main valve 4. It is preferable that the line 15 transmit a substantial constant head to the point 16 although the constancy of this head has little effect on the results accomplished by my invention, but does relieve the valve and control of considerable wear.

With the connections as shown, a very small drop in pressure in the line 2 causes a similar drop in pressure in the diaphragm chambers 21 and 33 causes the valve G to tend to close and the valve C to tend to open simultaneously. Such a movement of the auxiliary valves results in a proportionate increase of outflow to inflow from and into the chamber 14, thereby causing a considerable loss in pressure in the chamber 14 permitting the spring 10 to raise the closure member 5 further from the seats of the valve 4 and increasing the flow through the valve, thus increasing the pressure in the line 2. An increase in pressure above the desired amount in the line 2, causes the auxiliary valves to move simultaneously in opposite directions causing a proportionately great increase in pressure in the diaphragm chamber 14, which tends to throttle the valve 4 and reduce the pressure.

In adjusting the device for operation, the strain on the spring 10 is fixed through the nut 11 to be a comfortable working amount less than the desired reduced pressure times the effective area of the diaphragm 8 so that when the valve C is tight shut and the valve G wide open and the pressure in the chamber 14 is substantially equal to the pressure in the line 2, the closure member 5 will be firmly seated. With this primary adjustment, the compression in the springs 20 and 32 is adjusted through the nuts 22 and 35 so that when the reduced pressure is established in the chambers 21 and 33 that the valve closure members 18 and 31 will float about midway from their seats. When the valve is put into operation and before any pressure is established in the line 2, the valve 4 is wide open with the closure member 5 removed from its seat, the valve G is tight shut and the valve C is wide open providing a discharge opening but no intake opening for the chamber 14.

As pressure builds up in the line 2, pressure is established in the chambers 21 and 33 until the valve 18 begins to open and the valve 31 begins to close, thus creating first a small pressure in the chamber 14 tending to pinch the valve 4. When the valve is fully in operation the desired reduced pressure is established by adjusting the strain in the springs 10, 20 and 32. Thus if the reduced pressure is 200 pounds and it is desired to be established at 175 pounds, the compression in the spring 10 may be relieved through the nut 11 until the reduced pressure falls to the lesser amount. A similar result can be effected by relieving the compression of the springs 20 and 32 or the spring 32 alone so that higher pressure is maintained in the chamber 14 tending to pinch the valve 4 and lower the reduced pressure. Conversely through opposite adjustment the reduced pressure can be increased within a wide range.

While the foregoing has been a description of a preferred form of my invention I do not care to be particularly limited to the particular embodiment shown and described or in any manner other than by the claim appended hereto.

I claim:—

In combination, a pipe, a fluid actuable valve in said pipe having a pressure chamber for actuating fluid and a part enclosing one side of said chamber for moving said valve, means exerting a force tending to move said valve in opposition to the force exerted upon said part, means for adjusting and varying said last named means, fluid conducting means extending from said pipe to said pressure chamber and fluid conducting means leading from said pressure chamber to a point of lower pressure than the pressure in said pipe, and means for controlling the inflow to said pressure chamber and outflow therefrom comprising independently operable and adjustable valves, one controlling the inflow and the other controlling the outflow to and from said chamber, each of said valves having an independently operating pressure chamber and a part for moving said valve enclosing one side of each of said chambers, said chambers having fluid communication with each other and with said pipe, one of said valves being movable toward open position whilst the other is moved toward closed position in response to changes in pressure in said pipe.

In testimony whereof, I hereunto affix my signature.

HENRY J. MASTENBROOK.